US011849347B2

(12) United States Patent
Payton et al.

(10) Patent No.: US 11,849,347 B2
(45) Date of Patent: Dec. 19, 2023

(54) TIME AXIS CORRELATION OF PULSED ELECTROMAGNETIC TRANSMISSIONS

(71) Applicant: PARSONS CORPORATION, Centreville, VA (US)

(72) Inventors: Joseph Payton, Fredericksburg, VA (US); Samantha Palmer, Henrico, VA (US); Kyle Roberts, Centreville, VA (US)

(73) Assignee: PARSONS CORPORATION, Centreville, VA (US)

( * ) Notice: Subject to any disclaimer, the term of this patent is extended or adjusted under 35 U.S.C. 154(b) by 153 days.

(21) Appl. No.: 17/646,827

(22) Filed: Jan. 3, 2022

(65) Prior Publication Data
US 2022/0217578 A1 Jul. 7, 2022

Related U.S. Application Data

(60) Provisional application No. 63/133,985, filed on Jan. 5, 2021.

(51) Int. Cl.
*H04W 28/02* (2009.01)
*H04W 28/08* (2023.01)

(52) U.S. Cl.
CPC ...... *H04W 28/0284* (2013.01); *H04W 28/0908* (2020.05)

(58) Field of Classification Search
CPC ............ H04W 28/0284; H04W 28/0908
See application file for complete search history.

(56) References Cited

U.S. PATENT DOCUMENTS 5,365,592 A 11/1994 Horner et al.
5,436,847 A 7/1995 Schroer et al.
(Continued)

FOREIGN PATENT DOCUMENTS

CA 3097612 A1 10/2019
CN 201476875 5/2010
(Continued)

OTHER PUBLICATIONS

Axell, Erik, et al., "Optimal and Sub-Optimal Spectrum Sensing of OFDM Signals in Known and Unknown Noise Variance." IEEE Journal on Selected Areas in Communications, vol. 29, No. 2, Feb. 2011, pp. 290-304.
(Continued)

*Primary Examiner* — Janice N Tieu
(74) *Attorney, Agent, or Firm* — Martensen IP; Michael C. Martensen

(57) ABSTRACT

The disclosed invention uses computer-implemented algorithms, including machine learning algorithms, to detect radiofrequency (RF) transmissions within a congested RF environment. Some embodiments include a method for sampling an RF environment, mapping the sampled signals onto a spectrogram, extracting signal start times from the spectrogram and loading the start times into a bit array. The method continues by correlating a subset of start times with each other, each subset representing a potential pulsed signal. The subsets are selected for strength of correlation by threshold analysis, and then are subject to sine wave analysis to precisely identify start times within the selected subsets before selecting strongly matched subsets by another threshold analysis. In other embodiments, a system for detecting pulsed RF signals includes a RF receiver, a signal detector, a converter for creating a bit array, a correlator, a first
(Continued)

threshold discriminator, a sine wave analyzer, and a second threshold discriminator.

19 Claims, 7 Drawing Sheets

(56) References Cited

U.S. PATENT DOCUMENTS

| | | | |
|---|---|---|---|
| 5,867,535 | A | 2/1999 | Phillips et al. |
| 6,078,736 | A | 6/2000 | Guccione |
| 6,539,438 | B1 | 3/2003 | Ledzius et al. |
| 6,874,145 | B1 | 3/2005 | Ye |
| 7,210,121 | B2 | 4/2007 | Xia et al. |
| 7,317,761 | B2 | 1/2008 | Lozhkin |
| 7,320,062 | B2 | 1/2008 | Master et al. |
| 7,349,503 | B2 | 3/2008 | Husted et al. |
| 7,366,246 | B2 | 4/2008 | Walker et al. |
| 7,369,485 | B2 | 5/2008 | Halford et al. |
| 7,403,505 | B2 | 7/2008 | Yoon et al. |
| 7,430,257 | B1 | 9/2008 | Shattil |
| RE41,130 | E | 2/2010 | Fette et al. |
| 7,684,467 | B2 | 3/2010 | Li et al. |
| 7,929,937 | B2 | 4/2011 | Koivunen et al. |
| 7,937,601 | B2 | 5/2011 | Bakker et al. |
| 7,987,151 | B2 | 7/2011 | Schott et al. |
| 7,987,432 | B1 | 7/2011 | Grechishkin et al. |
| 8,086,836 | B2 | 12/2011 | Chong et al. |
| 8,364,946 | B2 | 1/2013 | Ishebabi |
| 8,412,111 | B2 | 4/2013 | Talwar et al. |
| 8,615,206 | B2 | 12/2013 | Meng |
| 8,677,378 | B2 | 3/2014 | Murotake et al. |
| 8,763,004 | B1 | 6/2014 | Callahan, III |
| 8,850,411 | B2 | 9/2014 | Kelem et al. |
| 9,663,659 | B1 | 5/2017 | Harlow |
| 2003/0011514 | A1 | 1/2003 | Krichofer et al. |
| 2004/0023674 | A1 | 2/2004 | Miller |
| 2004/0093595 | A1 | 5/2004 | Bilange |
| 2005/0120346 | A1 | 6/2005 | Sprigg |
| 2005/0125513 | A1 | 6/2005 | Sin-Ling Lam et al. |
| 2006/0195840 | A1 | 8/2006 | Sundarrajan et al. |
| 2006/0218549 | A1 | 9/2006 | Hsu et al. |
| 2006/0248445 | A1 | 11/2006 | Rogerson et al. |
| 2007/0256073 | A1 | 11/2007 | Troung et al. |
| 2008/0040507 | A1 | 2/2008 | Hsu et al. |
| 2008/0134143 | A1 | 6/2008 | Hoerentrup et al. |
| 2008/0147705 | A1 | 6/2008 | Bansal et al. |
| 2008/0198948 | A1 | 8/2008 | Tang |
| 2008/0318544 | A1 | 12/2008 | Wang et al. |
| 2009/0031396 | A1 | 1/2009 | Jung et al. |
| 2009/0119773 | A1 | 5/2009 | D'Amore et al. |
| 2009/0129493 | A1 | 5/2009 | Zhang et al. |
| 2009/0215390 | A1 | 8/2009 | Ku et al. |
| 2009/0279626 | A1 | 11/2009 | Wang |
| 2009/0287894 | A1 | 11/2009 | Renno |
| 2009/0290552 | A1 | 11/2009 | Bertorelle |
| 2009/0307540 | A1 | 12/2009 | Razazian et al. |
| 2009/0313620 | A1 | 12/2009 | Sedukhin et al. |
| 2010/0086074 | A1 | 4/2010 | Chen et al. |
| 2010/0138501 | A1 | 6/2010 | Clinton et al. |
| 2010/0142463 | A1 | 6/2010 | Ueda et al. |
| 2010/0202574 | A1 | 8/2010 | Chen et al. |
| 2010/0205274 | A1 | 8/2010 | Gharabally et al. |
| 2010/0226454 | A1 | 9/2010 | Bliss et al. |
| 2010/0235261 | A1 | 9/2010 | Lloyd et al. |
| 2010/0306773 | A1 | 12/2010 | Lee et al. |
| 2010/0319051 | A1 | 12/2010 | Bafna et al. |
| 2011/0296412 | A1 | 12/2011 | Banga et al. |
| 2012/0023194 | A1 | 1/2012 | Ruiz-Velasco et al. |
| 2012/0030672 | A1 | 2/2012 | Zygmuntowicz et al. |
| 2012/0036552 | A1 | 2/2012 | Dare et al. |
| 2012/0054184 | A1 | 3/2012 | Masud et al. |
| 2012/0066679 | A1 | 3/2012 | Pappas et al. |
| 2012/0151479 | A1 | 6/2012 | Kothari |
| 2012/0303695 | A1 | 11/2012 | Michel et al. |
| 2013/0061222 | A1 | 3/2013 | Hwang et al. |
| 2013/0067089 | A1 | 3/2013 | Synytskyy et al. |
| 2013/0102254 | A1 | 4/2013 | Cyzs et al. |
| 2013/0111328 | A1 | 5/2013 | Khanna et al. |
| 2013/0167135 | A1 | 6/2013 | Neumann et al. |
| 2013/0181867 | A1 | 7/2013 | Sturdivant et al. |
| 2013/0191495 | A1 | 7/2013 | Almstrand et al. |
| 2013/0198734 | A1 | 8/2013 | Biswas et al. |
| 2013/0212559 | A1 | 8/2013 | Lehtimaki et al. |
| 2013/0227565 | A1 | 8/2013 | Lee et al. |
| 2013/0283400 | A1 | 10/2013 | Schneider et al. |
| 2013/0308940 | A1 | 11/2013 | Kpodzo et al. |
| 2013/0326499 | A1 | 12/2013 | Mowatt et al. |
| 2013/0332991 | A1 | 12/2013 | Rivera |
| 2013/0346965 | A1 | 12/2013 | Conlan et al. |
| 2014/0007048 | A1 | 1/2014 | Qureshi et al. |
| 2014/0007122 | A1 | 1/2014 | Udeshi et al. |
| 2014/0072947 | A1 | 3/2014 | Boguraev et al. |
| 2014/0079235 | A1 | 3/2014 | Lyons |
| 2015/0270917 | A1 | 9/2015 | Roman et al. |
| 2015/0356431 | A1 | 12/2015 | Saxena |
| 2017/0011625 | A1 | 1/2017 | Stelzig et al. |
| 2017/0024449 | A1 | 1/2017 | Wesley et al. |
| 2020/0162559 | A1 | 5/2020 | Sustaeta et al. |
| 2020/0242516 | A1 | 7/2020 | Dhingra et al. |
| 2021/0305808 | A1* | 9/2021 | Doynov ............... H02H 5/00 |
| 2022/0213786 | A1* | 7/2022 | Jarrot ................ G06N 3/047 |

FOREIGN PATENT DOCUMENTS

| | | |
|---|---|---|
| CN | 202794534 | 3/2013 |
| CN | 102158242 | 7/2013 |
| DE | 102007034851 | 1/2009 |
| WO | 2014/118179 A1 | 8/2014 |

OTHER PUBLICATIONS

Bokharaiee, Simin, "Blind Spectrum Sensing for OFDM-Based Cognitive Radio Systems." IEEE Transactions on Vehicular Technology, vol. 60, No. 3, Mar. 2011, pp. 858-871.

Chen, Hou-Shin, et al., "Spectrum Sensing for OFDM Systems Employing Pilot Tones," IEEE Transactions on Wireless Communications, vol. 8, No. 12, Dec. 2009, pp. 5862-5870.

Rui, Yun, "Frequency Domain Discrete Fourier Transform Spread Generalized Multi-Carrier System and Its Performance Analysis," Computer Communications 32 (2009), pp. 456-464.

Ehringer, "The Dalvik Virtual Machine Architecture", 8 pages, (Mar. 2010).

Li, et al., "XVM: A Bridge Between XML Data and Its Behavior", pp. 155-163, (May 17-22, 2004).

Slade, et al., "Reconfigurable Computing Application Frameworks," Brigham Young University, 10 pages (2003).

Boano, et al., "Controllable Radio Interference for Experimental and Testing Purposes in Wireless Sensor Networks," www.soda.swedish-ict.se, 8 pages (Apr. 20, 2015).

Spirent Communications of Eatontown, L.P., "Spirent Communications TAS 4600A Noise and Interference Emulator Operations Manual," 168 pages (2001).

Tu, "Radio Regulations of the International Telecommunication Union Radiocommunication Sector (ITU-R) (2012 Ed.)", 432 pages (2012).

Al-Khateeb et al. "Recurring and Novel Class Detection Using Class-Based Ensemble for Evolving Data Stream", IEEE Transactions on Knowlede and Data Engineering, IEEE Service Center, Los Alamitos, CA, US, vol. 28, No. 10, Oct. 1, 2016, pp. 2752-2764.

Patent Cooperation Treaty Application No. PCT/US2020/046808, International Search Report and Written Opinion, Applicant Parsons Corporation, dated Nov. 18, 2020.

Patent Cooperation Treaty Application No. PCT/US2020/055369, International Search Report and Written Opinion, Applicant Parsons Corporation, dated Feb. 5, 2021.

Mankun, Xu, et al. "A New Time-Frequency Spectrogram Analysis of FH Signals by Image Enhancement and Mathematical Morphology", Image and Graphics, 2007, ICIG 2007, Fourth International Conference on, IEEE, Piscataway, NJ, USA Aug. 1, 2007, pp. 610-615.

(56) References Cited

OTHER PUBLICATIONS

Simstad, Erik, et al. "Medical Image Segmentation on GPUs—A Comprehensive Review", Medical Image Analysis, vol. 20, No. 1, Feb. 1, 2015, pp. 1-18.
Chu-Carrol, Jennifer, et al. "A Multi-Strategy and Multi-Source Approach to Question Answering", Jan. 1, 2006, URL: https://www.egr.msu.edu/~jchai/QAPapers/ibm.prager.pdf, pp. 1-8.
Abderrazzak, Samadi, et al. "A Syntactic and Semantic Multi-Agent Based Question Answering System for Collaborative E-Learning", 2018 4th International Converence on Optimization and Applications (ICOA), IEEE, Apr. 26, 2018, pp. 1-4.
Patent Cooperation Treaty Application No. PCT/US2020/055370, International Search Report and Written Opinion, Applicant Parsons Corporation, dated Mar. 12, 2021.
Popper, Christina et al., "Anti-Jamming Broadcast Communication Using Uncoordinated Spread Spectrum Techniques", IEEE Journal on Selected Areas in Communications, IEEE Service Center, Piscataway, US, vol. 28, No. 5, Jun. 1, 2010 (Jun. 1, 2010), pp. 703-715.
Patent Cooperation Treaty Application No. PCT/US2021/027663, International Search Report and Written Opinion, Applicant Parsons Corporation, dated Aug. 3, 2021.
Patent Cooperation Treaty Application No. PCT/US2021/027682, International Search Report and Written Opinion, Applicant Parsons Corporation, dated Jun. 16, 2021.
International Searching Authority, Application No. PCT/US2022/070013, "International Search Report and Written Opinion", Applicant Parsons Corporation, dated Apr. 8, 2022.
Anonymous, "Pulse Sequence Pulse Signal Generation Software User Manual", Version 09, Jan. 1, 2018 (Jan. 1, 2018), pp. 125-130. https://scdn.rohde-schwarz.com.

\* cited by examiner

TIME AXIS CORRELATION OF PULSED ELECTROMAGNETIC TRANSMISSIONS

CROSS-REFERENCE TO RELATED APPLICATIONS

This application claims priority to U.S. Provisional Application No. 63/133,985, filed Jan. 5, 2021, which is hereby incorporated herein by reference in its entirety.

BACKGROUND

Field of the Invention

Embodiments of the present invention relate, in general, to detection of frequency agile and pulsed signals and more particularly to detection and identification of time characteristics of frequency agile and pulsed signals in a congested environment.

Relevant Background

As the number and sophistication of electromagnetic spectrum transmissions continue to evolve and increase, the ubiquity of RF spectrum transmissions has created a congested environment. Within such congested environments are often layered pulsed, frequency hopping, or frequency agile, radio signals. Since the conception of frequency agile signals, a need to detect those signals has existed. Methods and techniques to do so are normally based on solid-state circuitry that implements one of a variety of logic elements to detect the signals in real time. However, identifying a frequency agile or pulsed signal within an RF-congested environment remains challenging even with customized solid-state circuitry or a dedicated logic element. What is needed therefore is a flexible and adaptable system and/or method to detect and identify time characteristics of frequency agile and pulsed signals quickly and efficiently. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the disclosure.

BRIEF DESCRIPTION OF THE DRAWINGS

Features and objects of the present invention and the manner of attaining them will become more apparent, and the invention itself will be best understood, by reference to the following description of one or more embodiments taken in conjunction with the accompanying drawings and figures embedded in the text below and attached following this description.

Figure 1:
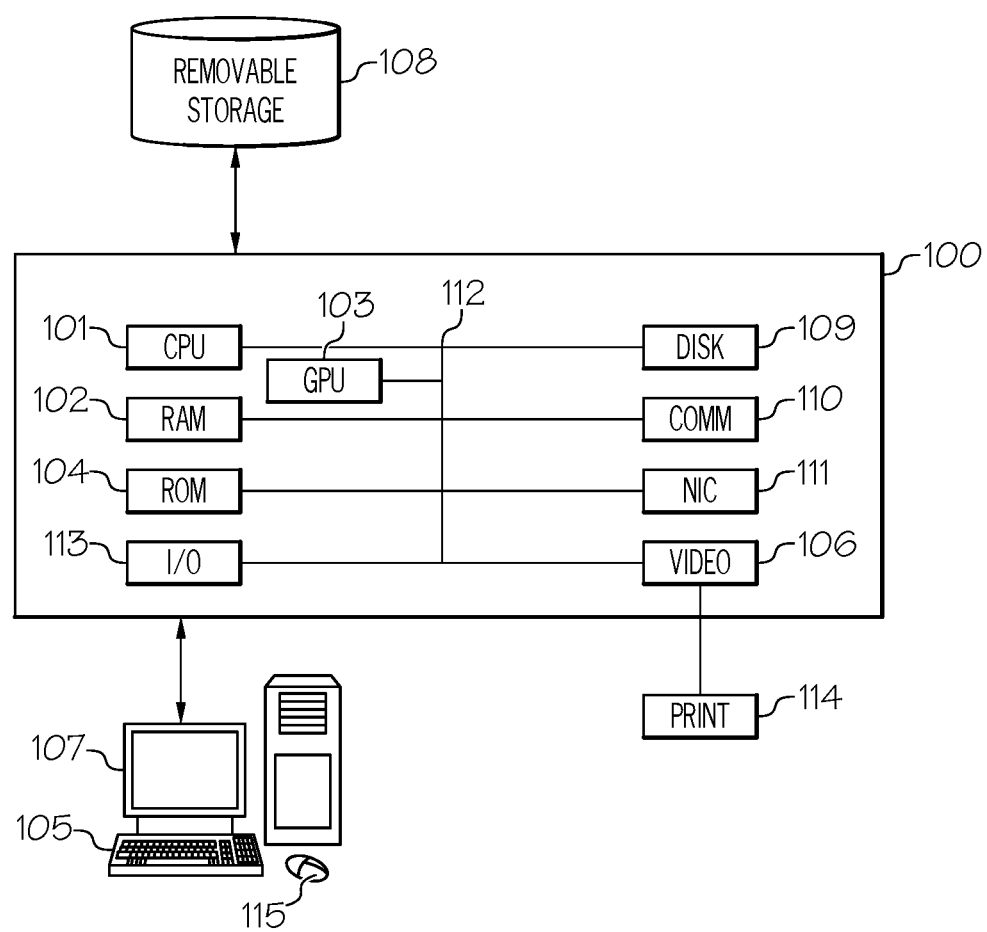
FIG. 1 depicts a view of a general purpose computer for executing elements of the disclosed invention.

The Figures depict embodiments of the disclosed invention for purposes of illustration only. One skilled in the art will readily recognize from the following discussion that alternative embodiments of the structures and methods illustrated herein may be employed without departing from the principles of the invention described herein.

Definitions

"Artificial Intelligence" (AI) or machine learning (ML) means a branch of computer science concerned with building smart machines capable of performing tasks that typically require human intelligence. AI is an interdisciplinary science with multiple approaches that allow machines to learn from experience, adjust to new inputs and perform human-like tasks. Using these technologies, computers can be trained to accomplish specific tasks by processing large amounts of data and recognizing patterns in the data.

"Fast Fourier Transform" (FFT) means a Fourier analysis of a periodic function referring to the extraction of the series of sines and cosines which when superimposed will reproduce the function. This analysis can be expressed as a Fourier series. The Fast Fourier Transform is a mathematical method or algorithm performing a discrete Fourier transform, i.e., transforming a function of time into a function of frequency and, in reverse, transforming a function of frequency into a function of time. Sometimes it is described as transforming from the time domain to the frequency domain and vice versa. It is very useful for analysis of time-dependent phenomena.

"Graphics Processor Unit" (GPU) means a specialized, electronic circuit designed to rapidly manipulate and alter memory to accelerate the creation of images in a frame buffer intended for output to a display device. GPUs may execute multiple threads in parallel and are well suited for high-throughputs operations.

"RF Spectrum" or "Radio Frequency Spectrum" means the part of the electromagnetic spectrum with frequencies from 30 hertz to 300 GHz. Electromagnetic waves in this frequency range, called radio waves, are widely used in modern technology, particularly in telecommunications.

"RF Environment" means all of the transmissions in the RF spectrum propagating through a given geographic area.

"Size, Weight, Power, and Cost" or "SWaP-C" means the hardware footprint of a piece of equipment or system. Swap-C refers to the optimization of the four hardware factors as weighed against the capabilities of the equipment or system.

"Software-defined radio" or "SDR" means a radio communication system implemented through software installed on a general or special purpose computer rather than through traditional hardware components, e.g., mixers, filters, amplifiers, modulators, signal detectors. A typical SDR may comprise a personal computer with a sound card linked to an RF front end. The computer's processor handles substantial portions of the signal processing, as opposed to the dedicated circuitry used in traditional radios. SDR systems are highly flexible as to radio protocols, and may accommodate a number of different and changing protocols in real time, e.g., cell phone services. SDRs can transmit using wideband, spread spectrum, and frequency hopping techniques to minimize interference within an RF environment. Further, a number of SDRs may be linked together into mesh networks reducing power requirements, size and interference caused by individual nodes in the network.

"Streaming Data" means data that is continuously generated by different sources. Such data is normally processed incrementally without having access to all of the data.

DETAILED DESCRIPTION

The disclosed invention uses artificial intelligence and conventional algorithms to detect time characteristics of frequency agile and pulsed electromagnetic signals, and to distinguish among such signals in congested RF environments.

The disclosed invention will now be described in detail with reference to several embodiments thereof as illustrated in the accompanying Figures. In the following description, specific details are set forth in order to provide a thorough understanding of embodiments of the disclosed invention. It will be apparent, however, to one skilled in the art that embodiments may be practiced without some or all of these specific details. In other instances, well known process steps and/or structures have not been described in detail in order to not unnecessarily obscure the invention. The features and advantages of embodiments may be better understood with reference to the drawings and discussions that follow.

It should be apparent to those skilled in the art that the described embodiments of the disclosed invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the disclosed invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the disclosed invention as the embodiments disclosed herein are merely exemplary.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used to describe one element or feature's relationship to another element(s) or feature(s) as illustrated in the figures. Such spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used for AI-guided and conventional algorithmic processes. Each block and combinations of blocks depicted in the flowchart illustrations, can be implemented by computer program instructions. These computer program instructions may be loaded onto a computer, a special purpose hardware-based computer system, or other programmable apparatus to produce a machine such that the executed instructions create means for implementing the functions specified in the flowchart block or blocks. These computer program instructions may also be stored in a computer-readable memory that can direct a computer or other programmable apparatus to function so that the instructions produce an article of manufacture that implements the function specified in the flowchart block or blocks. The computer program instructions may also be loaded onto a computer or other programmable apparatus to cause a series of operational steps to be performed so that the executed instructions provide steps for implementing the functions specified in the flowchart block or blocks.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

One having skill in the art will recognize that portions of the disclosed invention may be implemented on a specialized computer system, e.g., a software defined radio (SDR), or a general-purpose computer system, such as a personal computer (PC), a server, a laptop computer, a notebook computer, or a handheld or pocket computer. FIG. 1 is a general block diagram of a general purpose computer system in which software-implemented processes of the present invention may be embodied. As shown, the system 100 comprises one or more central processing unit(s) (CPU) or processor(s) 101 coupled to a random-access memory (RAM) 102, a graphics processing unit(s) (GPU) 103, a read-only memory (ROM) 104, a keyboard or user interface 105, a display or video adapter 106 connected to a display device 107 (e.g., screen, touchscreen, or monitor), a removable storage device 108 (e.g., floppy disk, CD-ROM, CD-R, CD-RW, DVD, etc.), a fixed storage device 109 (e.g., hard disk), a communication (COMM) port(s) or interface(s) 110, and a network interface card (NIC) or controller 111 (e.g., Ethernet). Although not shown separately, a real time system clock is included with the system 100, in a conventional manner.

The CPU 101 comprises a suitable processor for implementing the present invention. The CPU 101 communicates with other components of the system via a bi-directional system bus 112, and any necessary input/output (I/O) controller 113 circuitry and other "glue" logic. The bus, which includes address lines for addressing system memory, provides data transfer between and among the various components. RAM 102 serves as the working memory for the CPU 101. ROM 104 contains the basic I/O system code (BIOS), which is a set of low-level routines in ROM that application programs and the operating systems can use to interact with the hardware, including reading characters from the keyboard, outputting characters to printers 114, etc.

Mass storage devices 108, 109 provide persistent storage on fixed and removable media, such as magnetic, optical, or magnetic-optical storage systems, flash memory, or any other available mass storage technology. The mass storage may be shared on a network, or it may be a dedicated mass storage. As shown in FIG. 1, fixed storage 109 stores a body of program and data for directing operation of the computer system, including an operating system, user application programs, driver and other support files, as well as other data files of all sorts. Typically, the fixed storage 109 serves as the main hard disk for the system.

In operation, program logic (including that which implements methodology of the disclosed invention described herein) is loaded from the removable storage 108 or fixed storage 109 into the main (RAM) memory 102, for execution by the CPU 101. During operation of the program logic, the system 100 accepts user input from a keyboard and pointing device 115, as well as speech-based input from a voice recognition system (not shown). The user interface 105 permits selection of application programs, entry of keyboard-based input or data, and selection and manipulation of individual data objects displayed on the screen or display device 107. Likewise, the pointing device 115, such as a mouse, track ball, pen device, or a digit in the case of a touch screen, permits selection and manipulation of objects on the display device. In this manner, these input devices support manual user input for any process running on the system.

The computer system 100 displays text and/or graphic images and other data on the display device 107. The video adapter 106, which is interposed between the display 107 and the system bus, drives the display device 107. The video adapter 106, which includes video memory accessible to the CPU 101, provides circuitry that converts pixel data stored in the video memory to a raster signal suitable for use by a display monitor. A hard copy of the displayed information, or other information within the system 100, may be obtained from the printer 114, or other output device.

The system itself communicates with other devices (e.g., other SDRs or computers) via the NIC 111 connected to a network (e.g., Ethernet network, Bluetooth wireless network, etc.). The system 100 may also communicate with local occasionally connected devices (e.g., serial cable-linked devices) via the COMM interface 110, which may include a RS-232 serial port, a Universal Serial Bus (USB) interface, or the like. Devices that will be commonly connected locally to the interface 110 include SDRs, laptop computers, handheld computers, digital cameras, etc.

The system may be implemented through various wireless networks and their associated communication devices. Such networks may include SDRs, mainframe computers, or servers, such as a gateway computer or application server which may have access to a database. A gateway computer serves as a point of entry into each network and may be coupled to another network by means of a communications link. The gateway may also be directly or indirectly coupled to one or more devices using a communications link, or may be coupled to a storage device such as a data repository or database.

Artificial Intelligence Systems for Signal Detection

Certain functions of the disclosed invention are carried out by a system of intelligent agents that continually optimizes resources to progressively refine detection and characterization of radiofrequency signals in a given RF environment. Such techniques are discussed in detail in U.S. application Ser. No. 17/068,110, "GPU Accelerated Image Segmentation," which is hereby incorporated by reference herein in its entirety. The AI/ML systems used for signal detection and classification herein extract features from collected observations on the RF environment. Then the systems allow a suite of hierarchically organized intelligent agents to access the data repository to perform signal detection and classification. The signal classification system initially separates emitters from each other based on the characteristics of individually detected pulses, and then in some embodiments may classify the emitter groups using measured characteristics of each collection of pulses. These AI systems reduce the data burden and training time required to make fieldable, effective, and highly accurate signal detection capabilities, especially for traditionally difficult-to-capture protocols such as certain frequency agile communications, which may otherwise resemble noise. Indeed, some frequency agile transmitters are designed to resemble noise by "hopping" among frequencies at a rate exceeding 80,000 hops per second. Using the disclosed systems, small SWaP-C footprint equipment can successfully detect and classify frequency agile communications protocol in a matter of minutes.

Frequency Agile Signal Time Domain Analysis

Figure 2:
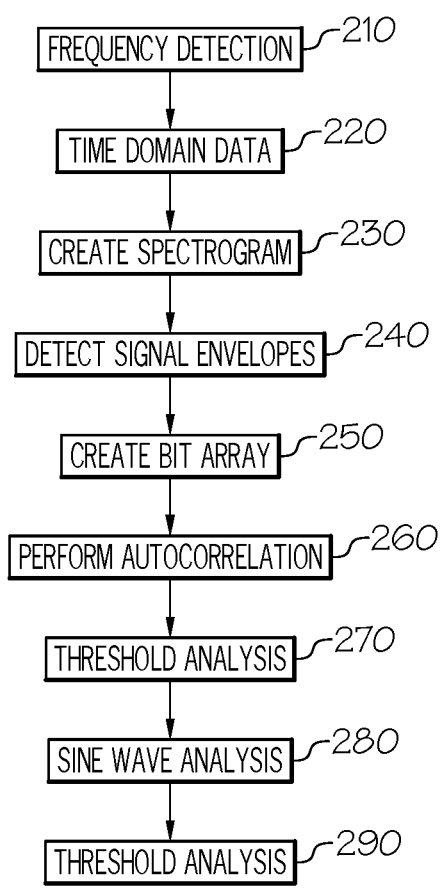
FIG. 2 depicts a flow diagram of artificial intelligence-assisted processes used in embodiments of the disclosed invention.

With reference to FIG. 2, is depicted a flowchart of a representative method for frequency agile signal detection in a congested environment according to an embodiment of the disclosed invention. Initial signal detection 210 is accomplished by a software defined radio or by the front end of a specialized RF transceiver, which surveys the RF environment, translates it to a streaming data source, and captures time domain data over a given period of time 220. The captured time domain data is processed and analyzed by, for example, an AI algorithm run on a GPU, and a spectrogram of the data is created 230. A spectrogram is representation of the captured data in the form of a rectilinear grid having a first axis and a second axis, each of which is divided into a plurality of axis units defining a grid of pixels forming the image. For a selected interval, the algorithm transforms the data into a pixelated image having time along the first axis and frequency along the second axis.

Signal envelope parameters 240 are then detected using the spectrogram. Each pixel within each axis unit of one axis is examined to determine whether it exceeds a predefined power threshold, and those pixels that exceed the threshold are defined as a positive return pixel. Those positive return pixels within a singular axis unit that are in proximity to other positive return pixels are grouped together. A similar analysis is conducted along the second axis, and groups of positive return pixels identified in each axis unit are thereafter merged together. The assembled groups of positive return pixels each represent a signal which is thereafter reported as a signal envelope. Detection of envelop parameters enables one to identify when a signal starts, when a signal ends, lower frequency bound, upper frequency bound, and the edges of the frequency band. Signal envelope parameters therefore allow the system to determine center frequency, bandwidth, and other relevant signal characteristics.

Figure 3:
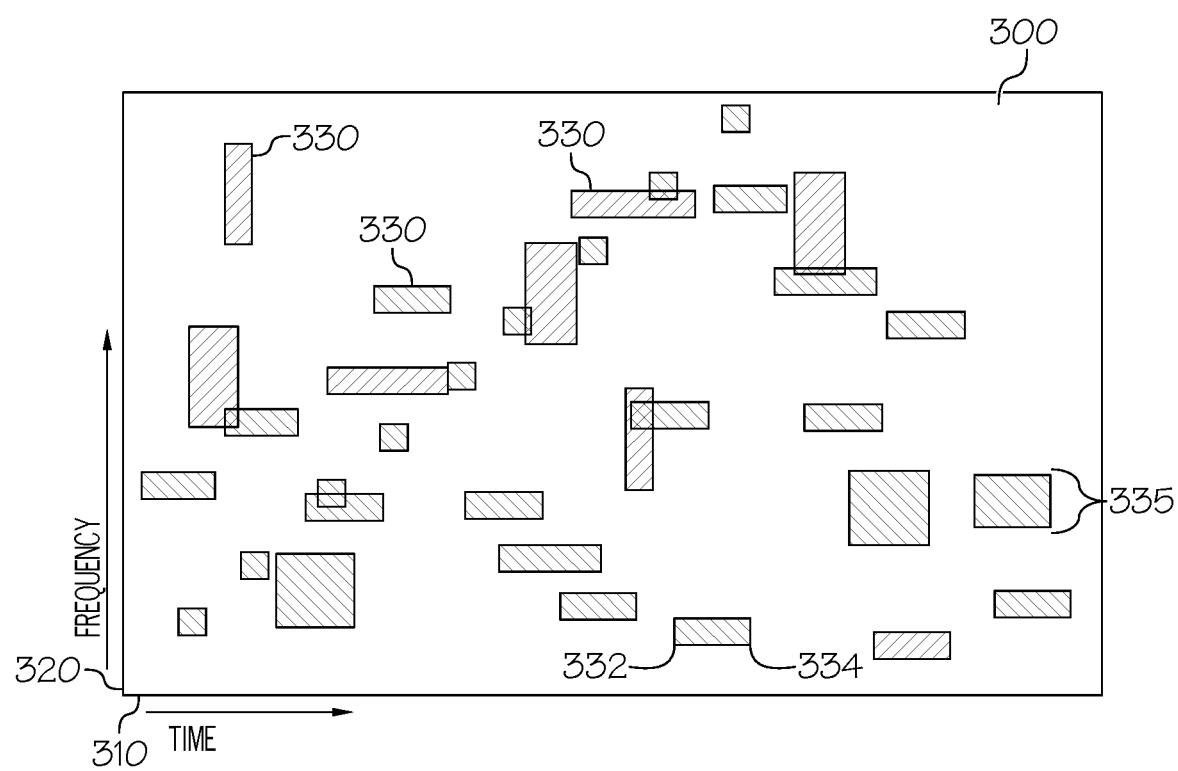
FIG. 3 depicts a spectrogram analysis of detected signals used in embodiments of the disclosed invention.

With reference to FIG. 3, a spectrogram 300 with defined signal envelope parameters is depicted. The spectrogram has a first axis 310 representing time, and a second axis representing frequency 320. The system has detected a number of potential signals, which have been analyzed, grouped and boxed into signal envelopes 330. Each signal envelope has a signal start time 332, a signal stop time 334, and a frequency range 335. For embodiments of the disclosed invention, time domain analysis continues by examining the signal start times 332 that are identified by those envelope parameters 330. Because of the complexity involved in sending and receiving pulsed signals, time intervals between pulses tend to be regular, while other signal parameters such as frequency are more freely varied. Discerning patterns in the time domain is therefore particularly suitable for detecting pulsed signals out of a congested environment, and distinguishing among multiple pulsed signals in the same environment. Time domain analysis greatly simplifies the signal detection and characterization process by allowing the system to ignore signal stop times 334 and frequency 335. However, in some embodiments, the process can incorporate signal stop times 334 to examine pulse length, or could examine signal bandwidth i.e., the full range of frequencies used by a discrete pulsed transmission. Such additional parameters might be useful in cases where using start times alone proves inadequate to characterize the signals. Signals with consistent pulse lengths, i.e., the duration from signal start to signal stop, or which transmit within a given frequency band would have additional points of comparison to distinguish among otherwise similar signals. With further reference to FIG. 2, the identified signal start times are then placed in a one-dimensional bit array 250.

Figure 4A:
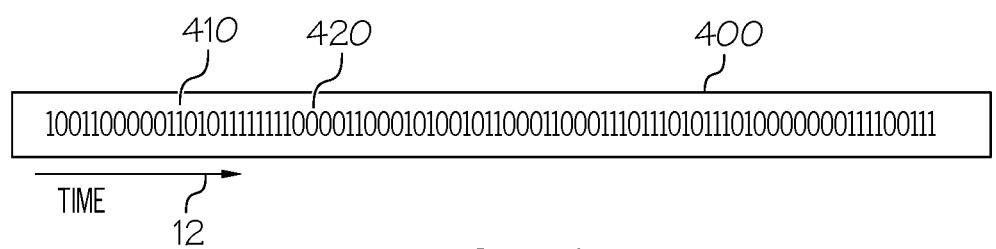
FIGS. 4A and 4B depict a bit array of signal start times as used in embodiments of the disclosed invention.

With reference to FIG. 4, a one-dimensional binary time domain array 400 is depicted. Assume, for example, that an SDR captures 1.6 milliseconds (ms) worth of data, and the AI detection algorithm has a pixel resolution of 20 microseconds (µs). The system creates a spectrogram of the detected potential signals, constructs signal envelopes around potential signals, and identifies a number of signal start times which a loaded into the array 400. The 1's 410 in the array represent pixels with an identified signal envelope start time, and the 0's 420 represent pixels where a signal start did not occur. Because the (exemplary) system resolution is 20 µs per pixel, each digit in the array represents a 20 µs slice of time in which a signal start was either detected or not detected. The bit array 400 is therefore a one-dimensional map of 1.6 ms of time. As you travel in the direction of the arrow 12, you progress forward in time by 20 µs intervals, and each one 410 encountered represents that a new signal start occurred within that interval. The amount of time processed and reduced to an array may vary, and may be, for example, 0.01 seconds, 0.1 seconds, 0.5 seconds, 1 second or longer. Pixel resolution may also vary, and may be, for example, 40 µs, 20 µs, 10 µs, 5 µs, 1 µs, 0.5 µs, or shorter. Either of these parameters can be adjusted depending on the requirements of signal detection on the one hand, e.g., frequency hops per second of targeted signals, and available processing power on the other hand.

Figure 4B:
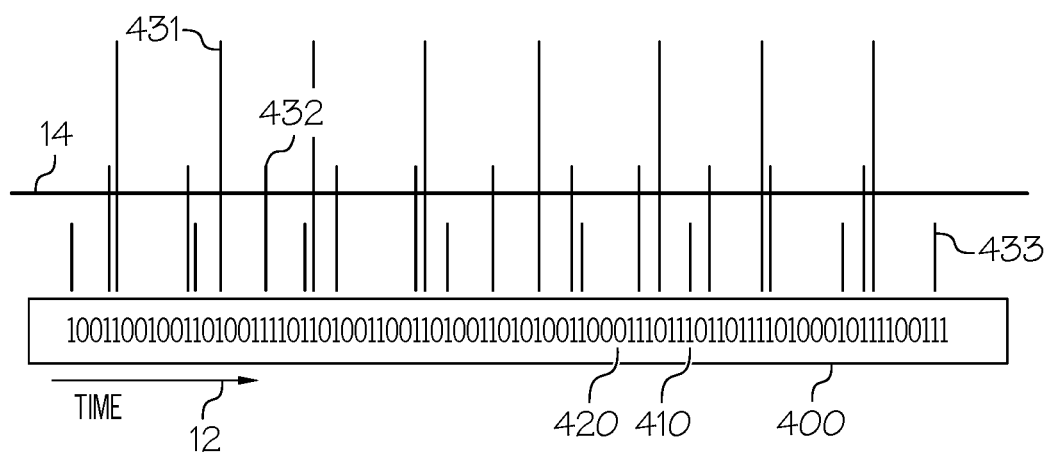

With further reference to FIG. 2, the process continues by performing a partial autocorrelation 260 of the array, followed by a first threshold analysis 270 step. Autocorrelation is a process by which the disclosed system analyzes the various signal starts to identify ones that are more likely to be part of a discrete frequency agile signal. The process establishes a degree of similarity between the array's values when compared against array values at later times and at various time intervals. By searching for patterns in signal start spacings, the process locates consistent or repeating spacing between signal starts. With reference to FIG. 4B, an autocorrelation process is depicted. The output of the autocorrelation is visually represented as a graph of peaks 431, 432, 433, wherein each peak corresponds to a signal start time 410, and correlation among the signal starts indicates repeating signal intervals. The length of the different peaks is an indication of the strength of the correlation among the various signal start times, where those having stronger correlations 431 are longer than those that are less correlated 433.

Once peaks are identified, a threshold 14 is established to eliminate those signal start times that are weakly correlated 433. Threshold setting is dynamic and is based on the strength of the correlations found in the data set, as well as the pixel resolution of the system. The system starts with an initial threshold level and then adjusts it based on system characteristics. The initial threshold levels are determined by experimentation with different datasets. Such experimentation includes, for example, examining autocorrelation results from different known pulsed signals of interest in various environments. Comparing the autocorrelated results to known signals allows the initial threshold level to be set. The initial threshold is then modified dynamically to account for system characteristics, primarily the time resolution capability. For example, a system with higher pixel resolution, i.e., having a shorter pixel window, could set a higher threshold since fewer discrete signals would be expected to have overlapping start times within any given pixel window. The process sets the threshold to reduce noise and eliminate potential false signal correlations from further analysis, which improves system accuracy and reduces use of computing resources.

Figure 5:
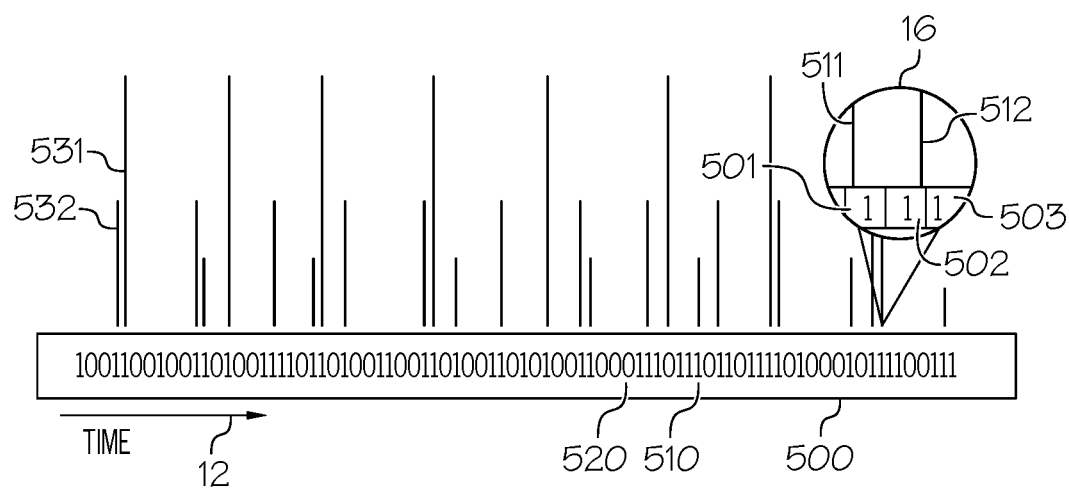
FIG. 5 depicts a bit array of signal start times as used in embodiments of the disclosed invention.

With further reference to FIG. 2, once strongly autocorrelated start times are established as potential pulsed signals, the process performs a sine wave analysis 280 to more accurately characterize the located signals. As with the autocorrelation step 260, sine wave analysis is also followed by a threshold analysis 290 step. With reference to FIG. 5, upon finding acceptably strong peaks in the autocorrelation 531, 532, a series of sine and cosine waves are multiplied and summed to correspond with the autocorrelated peaks. For each signal, the series of combined sine and cosine functions constructs a signal with wavelengths that cover the range from one time resolution unit prior to the peak, to one time resolution unit after the peak. Assuming again that each digit in the array 500 represents a 20 µs interval, each wave would therefore have a period of 40 µs. Sine wave analysis can be conceptualized as a partial Discrete Fourier Transform, focused on a specific frequency range and performed for the purpose of gaining a finer time resolution than can be derived from the autocorrelated signal start times. Sine wave analysis allows the system to mathematically determine more precise start times within each bit array location. For example, a signal start time 510 logged into the bit array is processed by the autocorrelation step as a peak located at the center of each location within the bit array, however, the peaks may actually fall anywhere within the 20 µs window. As shown in the inset 16, which depicts a magnified view of three sequential bit array locations 501, 502, 503, a start time peak may occur anywhere within the window, e.g., nearer the beginning of the 20 µs window 511, or nearer the end 512. Sine wave analysis thus improves the resolution of the system by identifying more precise start time locations. From the exemplary pixel window of 20 µs, sine wave analysis can locate the signal start to within 5 µs, 1 µs, 0.5 µs, or lower.

The system takes constructed sine waves with strong correlations to signal start times within the array, and duplicates those sine waves with various time offsets around the identified signal starts. Then the various iterations of the sine wave are compared across the bit array entries to determine which start time locations in the array are constituting the identified signal.

After sine wave analysis identifies potential signals, the process performs another threshold analysis step to reduce noise from the results. The process sets a dynamic threshold that sets a requirement on the strength of correlation between a constructed sine wave and particular autocorrelation peaks. For example, a sine wave may correspond more closely to a series of autocorrelation peaks where the sine wave peaks match a large number of sequential autocorrelation peaks, or wherein the sine wave achieves the most autocorrelation peak matches in a set unit of time, or wherein the sine wave achieves a set number of matches in the shortest amount of time, etc. Weakly correlated sine waves are discarded to eliminate potential false signal correlations from further analysis, which again improves system accuracy and more efficiently uses computing resources.

Figure 6:
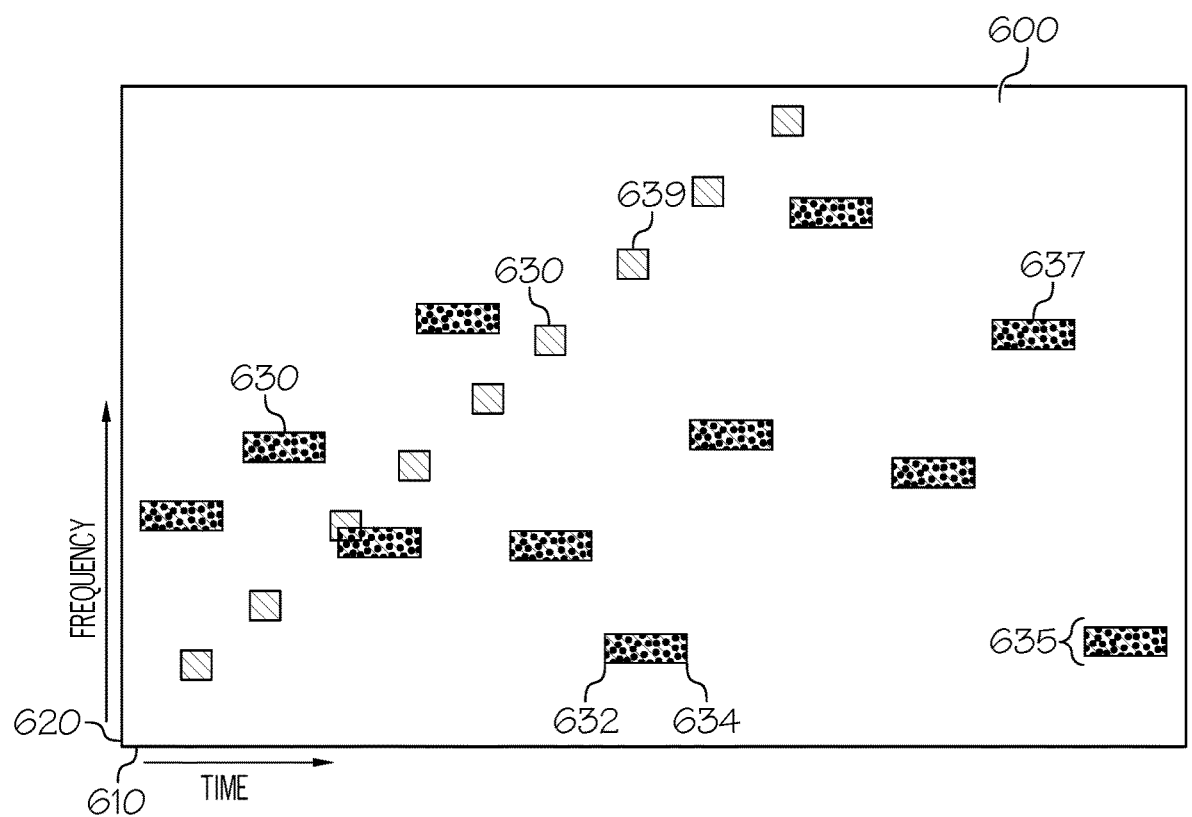
FIG. 6 depicts a spectrogram analysis of detected signals used in embodiments of the disclosed invention.

Once strongly correlated sine waves are identified and the most accurate signal start times are calculated, the process can perform additional steps to more fully characterize the identified potential signal. The system returns to the sampled RF environment captured by the SDR and extracts all of the detected pulses that have signal start times matching the start times in the identified potential signals. With reference to FIG. 6, a spectrogram 600 with isolated pulsed signal envelopes 630 is depicted. The system has extracted potential signal envelopes 630 having signal start times 632 corresponding to the identified signal start times. Then the system performs density based special clustering of applications with noise ("DBSCAN") processing as disclosed in U.S. application Ser. No. 16/996,322, "System and Methodology for Data Classification, Learning and Transfer," filed Aug. 18, 2020, and U.S. application Ser. No. 17/068,110, "GPU Accelerated Image Segmentation," filed Oct. 12, 2020, which are hereby incorporated by reference herein in their entirety. The correlated signal start times are processed through the DBSCAN clustering algorithm to locate transmitted groups of pulses. The groups of pulse start times 632, signal stop times 634 (pulse lengths), and frequency 635 are identified from those pulses, and outliers, i.e., misdetections caused by interference or other noise, are rejected. Shown are two exemplary sets of pulses 637, 639 that correspond to two discrete pulsed signals that have been identified by the system. Once the final set(s) of pulses are identified, the system generates a convex hull for each pulse. A convex hull is the minimum number of points in a point cloud that can form a closed region around all of the points in that point cloud. The convex hulls constructed around the pulses serve as a decision boundary for establishing signal identity. The system uses the constructed convex hulls to determine whether the identified pulse belongs to a known class of signal as compared to convex hulls stored in a database. This convex hull analysis and the autocorrelated start times are used to fully characterize the detected pulsed signal.

In some embodiments, the described process can be iterative. Once a signal has been precisely identified through sine wave analysis, that signal can be removed from the bit array by removing the corresponding start times. With further reference to FIG. 2, the remaining start times can then be subject to another round of autocorrelation and sine wave analysis, i.e., restarting the process at 260, or another round of sine wave analysis only, i.e., restarting the process at 280. Precisely located signals emerging from the second round of analysis can then be removed and the process repeated. Alternatively, once a pulsed signal has been precisely identified and removed, the system can revert back to the spectrogram step 230 and remove all of the signal pixels belonging to the identified signal, then the process can continue with constructing signal envelopes 240, bit array construction 250 and so on. While iterative processes can be used with certain embodiments, the preferred approach is to minimize the necessity of iterations when identifying signals according to the disclosed invention.

While the disclosed process has focused on the time domain because of its suitability for characterizing pulsed signals, in some embodiments, other signal parameters such as frequency, power, or other suitable parameters may be used.

Example. Assume two individuals are clapping so that each person claps at intervals of 5 seconds, and individual 1 began clapping 2 seconds before individual 2. Assuming a system resolution of 7 seconds, the disclosed process would identify each clap and place them into a bit array, however some locations would contain a clap from both individuals, i.e., because of the resolution, some claps overlap in a single array location. Autocorrelation would yield a set of peaks, spaced at 7 second intervals. The process would then apply sine wave analysis on the set of peaks to show that in fact there are two signals spaced at 5 second intervals and offset by 2 seconds.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words," "materials," etc. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for RF transmission shaping through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the invention.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with linked wide band transcorders, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

While this invention has been described in terms of several embodiments, there are alterations, modifications, permutations, and substitute equivalents, which fall within the scope of this invention. Although subsection titles have been provided to aid in the description of the invention, these titles are merely illustrative and are not intended to limit the scope of the present invention. In addition, where claim limitations have been identified, for example, by a numeral or letter, they are not intended to imply any specific sequence.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

This has been a description of the disclosed invention along with a preferred method of practicing the invention, however the invention itself should only be defined by the appended claims.

What is claimed is:

1. A computer-implemented method for detecting pulsed electromagnetic transmissions, the method comprising:
   sampling radiofrequency (RF) signals from an RF environment;
   using a machine learning (ML) detection algorithm to map onto a spectrogram one or more RF signals sampled from the RF environment;
   using an ML classification algorithm to characterize the one or more detected RF signals according to one or more envelope parameters, including a signal start time;
   identifying signal start times from the one or more characterized RF signals;
   populating a one-dimensional bit array, wherein each value in the array represents a sequential unit of time, wherein each signal start time is indicated by a value of one, and wherein each value not corresponding to a signal start time is a zero;
   identifying one or more subsets of the signal start times wherein each signal start time in a subset is correlated to the other signal start times in the subset;
   performing a first threshold analysis to identify subsets that are strongly correlated;
   analyzing the strongly correlated subsets through a sine wave analysis, wherein a plurality of peaks in a sine wave is matched to signal start times in a matched subset; and
   performing a second threshold analysis to determine if the matched subset is a strongly matched subset.

2. The method of claim 1, wherein the one or more signal criteria further includes one or more of: a signal stop time, a bandwidth, and a frequency.

3. The method of claim 1, wherein the unit of time is one of: 20 microseconds (μs), 15 μs, 10 μs, 5 μs, 1 μs, 0.5 μs.

4. The method of claim 1, wherein each of the one or more subsets is correlated by one or more intervals between signal start times.

5. The method of claim 4, wherein the one or more intervals include one of the following: a consistent interval, two or more repeating intervals.

6. The method of claim 1, wherein the first threshold analysis accounts for a pixel resolution.

7. The method of claim 1, wherein the second threshold analysis accounts for one of the following: a number of sequential start times matching peaks of a sine wave; a number of start times matching peaks of a sine wave within a set time window, or a number of start times matching peaks of a sine wave within a shortest time window.

8. The method of claim 1, the analyzing step further comprising adjusting a sine wave by applying a plurality of time offsets, wherein each of the plurality of time offsets is spaced at an interval from a strongly correlated start time, and wherein the sine wave is used to identify start times in a matched subset.

9. The method of claim 8, wherein the strongly matched sine wave is used to characterize an RF signal sampled from the RF environment.

10. A system for detecting pulsed electromagnetic transmissions, the system comprising:
    a receiver for sampling RF signals in an RF environment;
    a detector comprising a machine learning (ML) detection algorithm to detect one or more signal envelope parameters for one or more RF signals sampled from the RF environment, wherein one of the signal envelope parameters is a signal start time;

a converter configured to load a plurality of the signal start times into a one-dimensional bit array;

a correlator configured to identify one or more correlated subsets of the plurality of signal start times;

a first threshold configured to identify one or more strongly correlated subsets;

an analyzer configured to perform sine wave analysis on the one or more strongly correlated subsets to construct a sine wave, wherein a plurality of peaks in the sine wave match signal start times in each of the one or more subsets;

a second threshold configured to identify a strongly matched sine wave having a strong correlation to the signal start times in a subset.

11. The system of claim 10, wherein the one or more signal envelope parameters further includes one or more of: a signal stop time, a bandwidth, and a frequency.

12. The system of claim 10, wherein each of the one or more strongly correlated subsets is correlated by one or more intervals between signal start times.

13. The system of claim 12, wherein the one or more intervals include one of the following: a consistent interval, two or more repeating intervals.

14. The system of claim 10, wherein the first threshold accounts for a pixel resolution of the detector.

15. The system of claim 10, wherein the analyzer is configured to apply a plurality of time offsets to the sine wave, wherein each of the plurality of time offsets is spaced at an interval from a start time in a strongly correlated subset, and wherein the sine wave is used to identify start times in a matched subset.

16. The system of claim 10, wherein the second threshold accounts for one of the following: a number of sequential start times matching peaks of a sine wave; a number of start times matching peaks of a sine wave within a set time window, or a number of start times matching peaks of a sine wave within a shortest time window.

17. The system of claim 10, wherein the strongly matched sine wave is compared to the one or more RF signals sampled from the RF environment.

18. The system of claim 10, wherein each entry in the one-dimensional bit array represents a sequential unit of time.

19. The system of claim 18, wherein the unit of time is one of: 20 microseconds (μs), 15 μs, 10 μs, 5 μs, 1 μs, 0.5 μs.

* * * * *